United States Patent
Shtok et al.

(10) Patent No.: US 10,748,027 B2
(45) Date of Patent: Aug. 18, 2020

(54) CONSTRUCTION OF AN EFFICIENT REPRESENTATION FOR A THREE-DIMENSIONAL (3D) COMPOUND OBJECT FROM RAW VIDEO DATA

(71) Applicant: International Business Machines Corporation, Armonk, NY (US)

(72) Inventors: Joseph Shtok, Binyamina (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/149,231

(22) Filed: Oct. 2, 2018

(65) Prior Publication Data
US 2020/0104626 A1   Apr. 2, 2020

(51) Int. Cl.
G06K 9/46     (2006.01)
G06T 7/33     (2017.01)
G06T 7/50     (2017.01)

(52) U.S. Cl.
CPC ............ *G06K 9/4638* (2013.01); *G06T 7/33* (2017.01); *G06T 7/50* (2017.01)

(58) Field of Classification Search
CPC ............ G06K 9/4638; G06T 7/50; G06T 7/33
USPC ......................................................... 382/154
See application file for complete search history.

(56) References Cited

U.S. PATENT DOCUMENTS 9,466,143 B1 * 10/2016 Walvoord ............... G06T 15/00
2012/0237111 A1 *  9/2012 Sinha .................. G06K 9/6892
                                                        382/154

OTHER PUBLICATIONS

Snavely et al., "Photo Tourism: Exploring Photo Collections in 3D", ACM Transactions on Graphics, Jul. 2006, vol. 25 Issue 3, pp. 835-846.
Besl et al., "A method for registration of 3-D shapes", Feb. 1992, IEEE Transactions on Pattern Analysis and Machine Intelligence, vol. 14, Issue: 2.
Chan et al., "Active contours without edges", Feb. 2001, IEEE Transactions on Image Processing, vol. 10, Issue 2, pp. 266-277.
(Continued)

*Primary Examiner* — Wednel Cadeau
(74) *Attorney, Agent, or Firm* — Roy Melzer

(57) ABSTRACT

A method of constructing hierarchical representation models of compound 3D physical objects, comprising receiving a plurality of image sets depicting a compound 3D physical object constructed of a static component having a single representation state and dynamic component(s) having multiple representation states, each pair of the image sets corresponds depicts a respective dynamic component in one of its representation states, generating a pair of point cloud structures from each pair of image sets, analyzing the point cloud structures pair to identify common region(s) associated with the static component and region(s) of difference associated with the dynamic component, generating a hierarchical 3D representation model comprising a high level model of the static component generated from the common region(s) with a surface outline of the region(s) of difference associated with multiple lower level models constructed for the representation states of the dynamic component and outputting the hierarchical 3D representation model.

13 Claims, 4 Drawing Sheets

(56) References Cited

OTHER PUBLICATIONS

Kumar et al., "Alignment of 3D point cloud, CAD model, real-time camera view and partial point cloud for pipeline retrofitting application", 2018, International Conference on Electronics, Information, and Communication (ICEIC).

Diskin, "Dense 3D Point Cloud Representation of a Scene Using Uncalibrated Monocular Vision", May 2013, Master's thesis, University of Dayton, Dayton, Ohio.

Fang et al., "Research on Three-Dimensional Parallel Modeling Algorithm With Movable Point Cloud Data", 2016, 15th International Symposium on Parallel and Distributed Computing.

* cited by examiner

US 10,748,027 B2

CONSTRUCTION OF AN EFFICIENT REPRESENTATION FOR A THREE-DIMENSIONAL (3D) COMPOUND OBJECT FROM RAW VIDEO DATA

BACKGROUND

The present invention, in some embodiments thereof, relates to constructing representation models of compound 3D physical objects, and, more specifically, but not exclusively, to constructing hierarchical representation models of compound 3D objects with a high level model constructed for common static component(s) and a plurality of lower level models for each dynamic state of dynamic component(s).

3D models represent physical objects, either inanimate, living or a combination thereof using a collection of points in 3D space connected by various geometric entities such as, for example, triangles, lines, curved surfaces and/or the like. Most 3D models may be solid models defining the volume of the physical object, boundary (shell) models defining the boundary of the physical object and/or a combination thereof.

3D models are widely used in a variety of fields, industries and applications in which the models are utilized for various needs such as, for example, object detection, object tracking, object augmentation and/or the like. Such applications may range from gaming and virtual reality applications in which virtual entities are modeled to replicate and/or augment real world objects through design, research and medical application in which models of physical objects may be used for detection, simulation, analysis and/or the like to autonomous driving, security, surveillance and/or military applications in which models of physical objects may be applied for detection, tracking and/or the like.

SUMMARY

According to a first aspect of the present invention there is provided a computer implemented method of constructing hierarchical representation models of compound three dimension (3D) physical objects, comprising:

Receiving a plurality of image sets depicting a compound 3D physical object constructed of a static component having a single representation state and one or more dynamic components having a plurality of representation states. Each pair of the plurality of image sets corresponds to a respective dynamic component and each image set of the pair depicts the respective dynamic component in a respective one of the plurality of representation states.

Generating a pair of point cloud structures from each pair of image sets.

Analyzing the pair of point cloud structures registered to a common coordinate system to identify one or more common regions of the pair of point cloud structures associated with the static component and one or more regions of difference between the pair of point cloud structures associated with the respective dynamic component.

Generating a hierarchical 3D representation model of the compound physical object comprising a high level model of the static component generated from the one or more common regions with a surface outline of the one or more regions of difference associated with a plurality of lower level models each associated with a respective one of the plurality of representation states of the respective dynamic component. Each of the of lower level models is created from the segment of each of the pair of point clouds contained by the one or more regions of difference.

Outputting the hierarchical 3D representation model.

According to a second aspect of the present invention there is provided a system for constructing hierarchical representation models of compound three dimension (3D) physical objects, comprising a program store storing a code and one or more processors coupled to the program store for executing the stored code, the code comprising:

Code instruction to receive a plurality of image sets depicting a compound 3D physical object constructed of a static component having a single representation state and one or more dynamic components having a plurality of representation states. Each pair of the plurality of image sets corresponds to a respective dynamic component and each image set of the pair depicts the respective dynamic component in a respective one of the plurality of representation states.

Code instruction to generate a pair of point cloud structures from each pair of image sets.

Code instruction to analyze the pair of point cloud structures registered to a common coordinate system to identify one or more common regions of the pair of point cloud structures associated with the static component and one or more regions of difference between the pair of point cloud structures associated with the respective dynamic component.

code instruction to generate a hierarchical 3D representation model of the compound physical object comprising a high level model of the static component generated from the one or more common regions with a surface outline of the one or more regions of difference associated with a plurality of lower level models each associated with a respective one of the plurality of representation states of the respective dynamic component. Each of the of lower level models is created from the segment of each of the pair of point clouds contained by the one or more regions of difference.

Code instruction output the hierarchical 3D representation model.

According to a third aspect of the present invention there is provided a computer program product for constructing hierarchical representation models of compound three dimension (3D) physical objects, comprising:

A non-transitory computer readable storage medium;

First code instructions for receiving a plurality of image sets depicting a compound 3D physical object constructed of a static component having a single representation state and one or more dynamic components having a plurality of representation states. Each pair of the plurality of image sets corresponds to a respective dynamic component and each image set of the pair depicts the respective dynamic component in a respective one of the plurality of representation states.

Second code instructions for generating a pair of point cloud structures from each pair of image sets.

Third code instructions for analyzing the pair of point cloud structures registered to a common coordinate system to identify one or more common regions of the pair of point cloud structures associated with the static component and one or more regions of difference between the pair of point cloud structures associated with the respective dynamic component.

Fourth code instructions for generating a hierarchical 3D representation model of the compound physical object comprising a high level model of the static component generated from the one or more common regions with a surface outline of the one or more regions of difference associated with a plurality of lower level models each associated with a respective one of the plurality of representation states of the respective dynamic component. Each of the of lower level models is created from the segment of each of the pair of point clouds contained by the one or more regions of difference.

Fifth code instructions for outputting the hierarchical 3D representation model;

Wherein the first, second, third, fourth and fifth program instructions are executed by one or more processors from said non-transitory computer readable storage medium.

The hierarchical 3D representation model may establish a single model for representing a plurality of representation states of the compound physical object. The single hierarchical 3D representation model may therefore present significantly reduced and potentially no data redundancy compared to a plurality of 3D representation models constructed separately for each of the representation states of the compound physical object. Reducing the volume of redundant data may in turn significantly reduce the storage resources (e.g. storage capacity, retrieval time from storage, etc.) required for storing the single hierarchical 3D representation model. Reducing the storage resource may reduce storage cost as well as allow systems and/or devices having limited storage resources to apply the hierarchical 3D representation model for one or more applications. Moreover, due to its modular and hierarchical nature, the hierarchical 3D representation model may require significantly reduced computing resources for processing the hierarchical 3D representation model for detecting, tracking and/or augmenting the respective compound physical object. Changes in the representation states (appearance) of the compound physical object may be easily mapped to the respective lower level 3D representation model generated for the dynamic components of the compound physical object without the need to process complete separate models. In addition, instead of applying a full scale object search and/or comparison for detecting, tracking and/or augmenting the compound physical object, local search or comparison may be applied to relevant component, portions, sections and/or segments of the hierarchical 3D representation model. This may further reduce the computing resources required for processing the hierarchical 3D representation model. Furthermore, due to the modular design of the hierarchical 3D representation model, lower level 3D representation models created for one dynamic component may be shared, applied and/or re-used for one or more other dynamic components of the same type that are detected in the compound physical object.

In a further implementation form of the first, second and/or third aspects, each pair of image sets corresponding to a respective dynamic component point depicts the respective states of the respective dynamic component while depicting a common state of each of one or more other dynamic components. Using image sets which depict the different states of only a single dynamic component may be essential to prevent associating regions of difference relating to one dynamic component with another dynamic component.

In a further implementation form of the first, second and/or third aspects, the pair of point cloud structures is generated from the pair of image sets by applying one or more structure from motion (SfM) algorithms Using industry standard tools, algorithms and/or models for generating the point cloud structures may significantly reduce costs of resources applied to create hierarchical 3D representation models for compound physical objects. This may also increase adoption of the hierarchical 3D representation models construction since existing, known and stable tools are employed for the hierarchical 3D representation models creation.

In a further implementation form of the first, second and/or third aspects, each of the point cloud structures is associated with one or more key frames generated from the respective image set of the pair, the one or more key frames comprising pose information defining a view angle of the depicted compound physical object with respect to an imaging sensor which captured the respective image set. Using the key frames generated from the image sets is known in the art for aligning point cloud structures with each other in a common coordinate system.

In an optional implementation form of the first, second and/or third aspects, the pair of point cloud structures are registered to the common coordinate system according to the pose information extracted from the one or more key frames of each image set of the pair for points of the point cloud structures corresponding to the static component. The pose information may be a major contributor to correctly align the point cloud structures with each other.

In a further implementation form of the first, second and/or third aspects, the analysis to identify the one or more regions of difference comprising classifying each point of a plurality of points corresponding to the compound physical object in each of the pair of point cloud structures to the static component or to the respective dynamic component by performing the following:

(a) Compute the location of the respective point in the common coordinate system.
(b) Compute a visual descriptor for the respective point in each of the pair of point cloud structures.
(c) Calculate a Euclidean distance between the two visual descriptors computed for the respective point in the two point cloud structures of the pair.
(d) Compute a score for the respective point based on the calculated Euclidean distance, and
(e) Classify the respective point to the respective dynamic component in case the computed score exceeds a predefined threshold or classify the respective point to the static component in case the computed score does not exceed the predefined threshold.

Classifying the points of the point cloud structures to the static component and to the dynamic component may present a significantly simpler technique for associating each point with the common region(s) or the region(s) of difference and hence with the static component or the dynamic component.

In a further implementation form of the first, second and/or third aspects, a boundary is defined for one or more of the regions of difference defining the segment which encompasses the points classified to the respective dynamic component. Drawing the boundary (line) may allow easily defining the points classified to the dynamic component (region(s) of difference). These easily identified points may be used to construct the respective lower level models representing the different states of the respective dynamic component.

In an optional implementation form of the first, second and/or third aspects, the respective point is filtered out in case the location of the respective point in the pair of point cloud structures exceeds a predefined threshold thus the respective point is determined to present insufficient differentiation between the two point cloud structures of the pair.

Comparing the location of the respective point in the two point cloud structures of the pair comprises:
(a) Computing a depth ratio of the depth of the respective point in each of the point cloud structures of the pair.
(b) Computing a difference between view angles of the respective point in each of the point cloud structures of the pair.
(c) Filtering out the respective point to the respective dynamic component in case the depth ratio or the view angle difference exceeds a predefined filtering threshold.

Filtering out points which have significantly low contribution to differentiate between the point cloud structures may reduce computing and/or storage resources required for constructing the hierarchical 3D representation model.

In an optional implementation form of the first, second and/or third aspects, one or more filters are applied to the score of at least some of the plurality of points to smooth the score. Smoothing the scores for at least some of the points may increase coherency and/or smoothness of the constructed hierarchical 3D representation model and/or part(s) thereof.

In a further implementation form of the first, second and/or third aspects, one or more of the filters is a bilateral filter. Using industry standard filters such as the bilateral filter may significantly reduce costs of resources applied to create hierarchical 3D representation models for compound physical objects.

In an optional implementation form of the first, second and/or third aspects, one or more segmentation algorithms are applied to optimize a shape of the segment defined by boundary for the one or more regions of difference according to one or more discrimination criteria. Optimizing the boundary(s) of the region(s) of difference may increase coherency and/or smoothness of the constructed hierarchical 3D representation model and/or part(s) thereof.

In an optional implementation form of the first, second and/or third aspects, the generated hierarchical three 3D representation model of the compound physical object is used for one or more of: object detection, object tracking and object augmentation. The hierarchical 3D representation models may be used by a plurality of industrial applications which may employ significantly reduced resources, for example, computing resources, storage resources, time and/or the like compared to using multiple full 3D representation models which often comprise large redundancy with each other.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
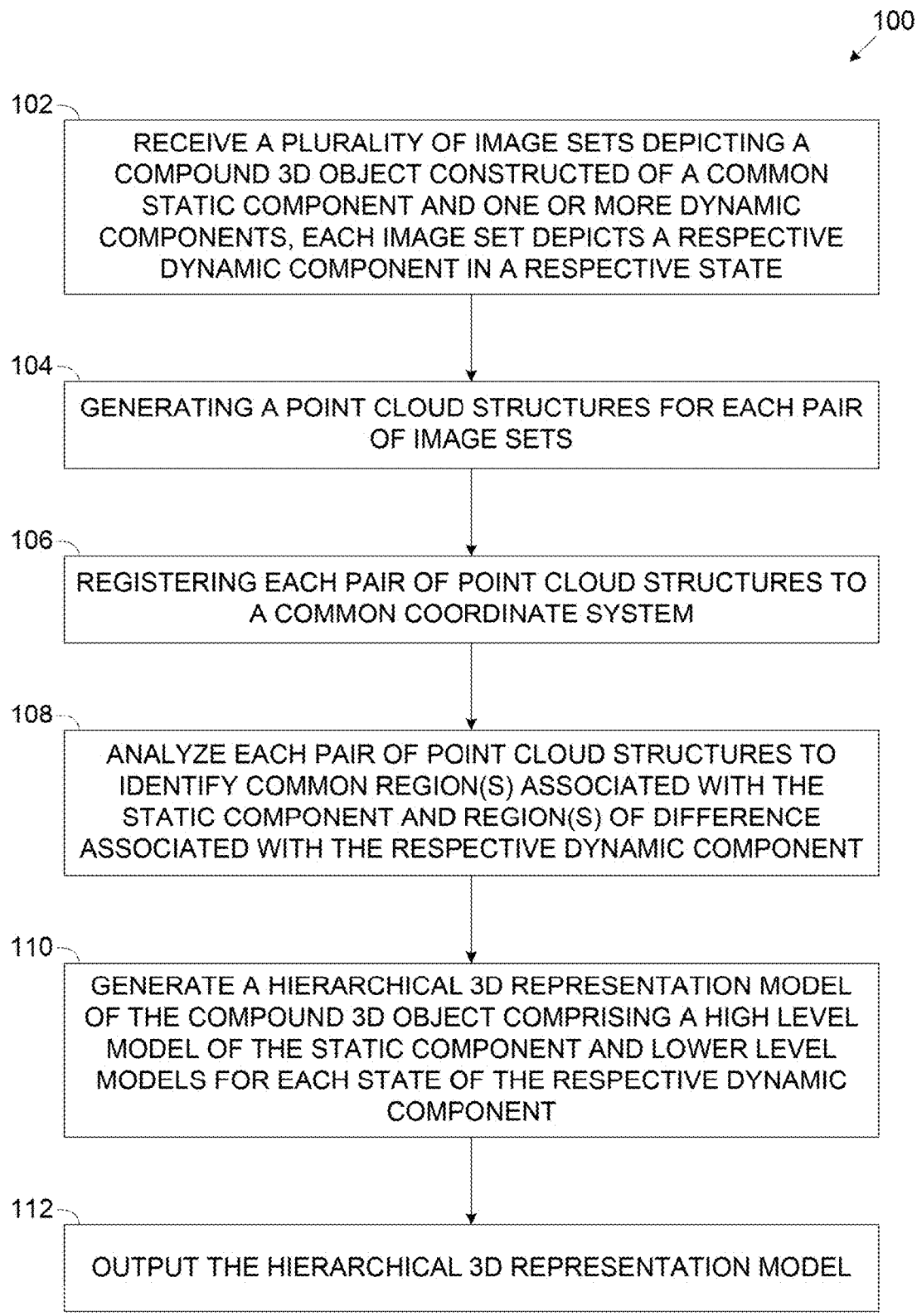
FIG. 1 is a flowchart of an exemplary process of constructing a hierarchical representation model of a compound 3D physical object, according to some embodiments of the present invention.

The present invention, in some embodiments thereof, relates to constructing representation models of compound 3D physical objects, and, more specifically, but not exclusively, to constructing hierarchical representation models of compound 3D objects with a high level model constructed for common static component(s) and a plurality of lower level models for each dynamic state of dynamic component(s).

According to some embodiments of the present invention, there are provided methods, systems and computer program products for generating hierarchical 3D representation models for compound 3D physical objects based on two dimensional (2D) imagery data depicting the compound physical objects, specifically monocular 2D imagery data. The 2D imagery data, for example, an image, a sequence of images, a video clip and/or the like depicting the compound physical object may be captured by one or more imaging sensors, for example, a camera, a video camera, a thermal imaging sensor, an infrared sensor and/or the like, specifically monocular imaging sensor(s).

It is assumed that the compound physical object is constructed of a main static component having a single representation state and one or more dynamic components each having a plurality of representation states. The representation state (appearance) defines one or more visual appearance features of the respective component (static or dynamic) of the compound physical object, for example, a positioning, a location, a pose, a composition, a texture, a color and/or the like. The static component may therefore define the general visual appearance of the compound physical object independently of changes to the appearance (representation state) of the dynamic component(s). In case the compound physical object does not comprise such a main static component but rather the main component is also dynamic, i.e. moveable, transformable and/or displaceable or there is no dominant static component, the compound physical object may be regarded as a different object in each of the different representation states of the main component. In such case multiple 3D high level representation models may be created for such compound physical object each corresponding to a different representation state of the static component.

The hierarchical 3D representation model created for the compound physical object comprises a high level 3D representation model created for the static component and a plurality of lower level 3D representation models created for each of the dynamic component(s) in each of their representation states. The high level 3D representation model of the static component is outlined with one or more surface segments identified for each of the dynamic component(s) and each of the surface segment(s) is associated (linked) with the respective lower level 3D representation models created for the representation states of the respective dynamic component.

The imagery data is captured, constructed and/or arranged to associate pairs of image sets each comprising one or more images with each of the dynamic components(s) where each image set of the pair depicts the respective dynamic components in a different representation state.

Pairs of image sets corresponding to each of the dynamic component(s) may be analyzed to generate a respective pair of point cloud structures for the compound physical object depicted in the two image sets. One or more techniques, methods and/or algorithm, for example, Structure from Motion (SfM) algorithm and/or the like may be applied to the pair of image sets to generate the respective point cloud structures. These algorithm(s) may be further applied to create one or more key frames for each of the point cloud structures of the pair. The key frames may comprise pose information defining a view angle of the depicted compound physical object with respect to the imaging sensor which captured the respective image set.

The two point cloud structures of the pair may be registered to a common coordinate system to align the point cloud structures with each other. The registration may be done based on the pose information extracted from the associated key frames and projecting cloud points of the first point cloud structure over the second point cloud structure to identify matching point, specifically matching of points which are part of the static component which is assumed to have little variation between the two point cloud structures. The matching may be done based on comparison of visual features extracted for the points using one or more feature extraction algorithms, for example, Scale-Invariant Feature Transform (SIFT) algorithm and/or the like.

After registered to a common coordinate system, the pair of point cloud structures is analyzed to identify one or more common regions which are present in both point cloud structures and one or more regions of difference between the point cloud structures. The common region(s) and the region(s) of difference may be further analyzed to verify they are part of the compound physical object rather than background elements. The common region(s) which present insignificant variance and potentially no variance in the two point cloud structures may be associated with the static component while the region(s) of difference presenting major variance between the two point cloud structures may be associated with the respective dynamic component.

Analyzing the point cloud structures to identify the common region(s) and the region(s) of difference may be done, for example, by classifying each of the points of the pair of point cloud structures to the common region(s) or to the region(s) of difference by computing for each point one or more visual descriptors comprising visual features extracted for the respective point. By comparing the values of the visual descriptors computed for the respective point in each of the two point cloud structures, the point may be determined to be classified to the common region(s) or to the region(s) of difference. Moreover, based on the classification of the points to the common region(s) or to the region(s) of difference, the surface segment(s) comprising the region(s) of difference may be identified and outlined (bounded).

The points classified to the common region(s) which is associated with the static component may be used for generating the high level 3D representation model for the static component. The outlined surface segment(s) may be marked in the high level 3D representation model for the static component. The points classified to the region(s) of difference which is associated with the respective dynamic component may be used for generating the lower level 3D representation models for the respective representation states of the respective dynamic component. Generating the 3D representation models for the static component and the respective dynamic component may be done using one or more methods, techniques and/or algorithms as known in the art, for example, a segmentation algorithm and/or the like.

The hierarchical 3D representation models may then be constructed by associating (linking) the lower level 3D representation models of the respective dynamic component to the surface segment(s) marked in the high level 3D representation model of the static component. Moreover, in case the compound physical object includes multiple dynamic components, the hierarchical 3D representation models may be constructed as a modular model in which the lower level 3D representation models generated for each dynamic component are linked to their respective surface segments outlined in the high level 3D representation model of the static component.

The 3D model generation process may of course be repeated for generating additional lower level 3D representation models for additional representation states of the respective dynamic component as well as for additional dynamic components.

The hierarchical 3D representation model of the compound physical object may be used for one or more of operations directed for one or more objectives, goals and/or uses, for example, object detection, object tracking, object augmentation and/or the like. Such operations may be highly suitable and effective for a plurality of applications, for example, autonomous vehicles, surveillance, security, virtual reality, augmented reality, training, education and/or the like.

The hierarchical 3D representation model constructed for the compound physical object may present significant advantages over currently existing methods and systems for model construction.

First, the hierarchical 3D representation model establishes a single model for representing a plurality of representation states of the compound physical object. The single hierarchical 3D representation model may therefore present significantly reduced and potentially no data redundancy compared to a plurality of 3D representation models constructed separately for each of the representation states of the compound physical object as may be done by the existing methods and systems. Such a plurality of separate 3D representation models constructed for the plurality of representation states of the compound physical object may naturally include high volumes of redundant data. Reducing the volume of redundant data may naturally significantly reduce the storage resources (e.g. storage capacity, retrieval time from storage, etc.) required for storing the single hierarchical 3D representation model compared to the plurality of separate 3D representation models constructed using the existing methods and systems. Reducing the storage resource may reduce storage cost as well as allow systems and/or devices having limited storage resources to apply the hierarchical 3D representation model for one or more applications.

Moreover, due to its modular and hierarchical nature, the hierarchical 3D representation model may require significantly reduced computing resources for processing the hierarchical 3D representation model for detecting, tracking and/or augmenting the respective compound physical object. Changes in the representation states (appearance) of the compound physical object may be easily mapped to the respective lower level 3D representation model generated for the dynamic components of the compound physical object without the need to process complete separate models as may be done by existing methods and systems. In addition, instead of applying a full scale object search and/or comparison for detecting, tracking and/or augmenting the compound physical object as may be done the existing methods and systems, local search or comparison may be applied to relevant component, portions, sections and/or segments of the hierarchical 3D representation model. This may further reduce the computing resources required for processing the hierarchical 3D representation model.

Furthermore, due to the modular design of the hierarchical 3D representation model, lower level 3D representation models created for one dynamic component may be shared, applied and/or re-used for one or more other dynamic components of the same type that are detected in the compound physical object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of constructing a hierarchical representation model of a compound 3D physical object, according to some embodiments of the present invention. An exemplary process 100 may be executed for generating a hierarchical 3D representation model for a compound 3D physical object constructed of a static component having a single representation state and one or more dynamic components each having a plurality of representation states. The representation state defines one or more visual appearance features of a respective component (static or dynamic) of the compound physical object, for example, a positioning, a location, a pose, a composition, a texture, a color and/or the like.

The hierarchical 3D representation model is created based on image sets comprising two dimensional (2D) images depicting each dynamic component in its plurality of representation states. Pairs of the image sets corresponding to the respective dynamic component are analyzed to generate respective pairs of point cloud structures which are further analyzed to identify common region(s) and one or more regions of difference between the point cloud structures of the pair. The common region(s) which are determined to be part of the compound physical object (rather than background elements) may be associated with the static component while the region(s) of difference which are determined to be part of the compound physical object may be associated with the respective dynamic component.

The 3D representation model may include a high level 3D representation model generated for the static component based on data extracted from the common region(s) and a plurality of lower level 3D representation models generated for the respective dynamic component based on data extracted from the region(s) of difference in each image set of the pair. As such, each of the lower level 3D representation models represents a respective one of the plurality of representation states of the respective dynamic component. The process may be repeated for one or more additional representation states of the respective dynamic component based respective pair(s) of image sets as well as for one or more additional dynamic components based on respective pairs of images sets.

The 3D representation model generated for the compound physical object may be used for one or more applications, for example, object detection, object tracking, object augmentation and/or the like.

Figure 2:
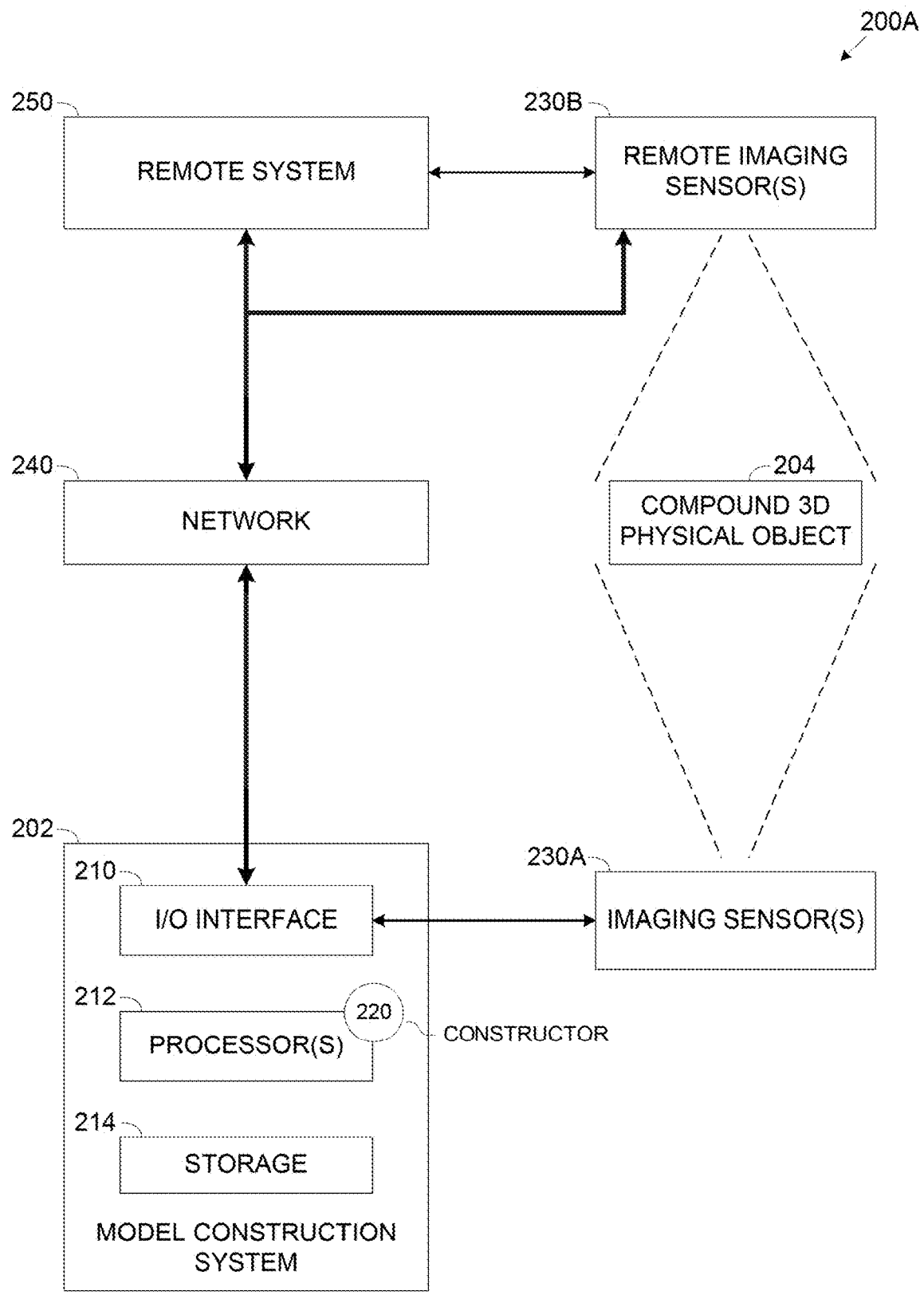
FIG. 2 is a schematic illustration of an exemplary system for constructing a hierarchical representation model of a compound 3D physical object, according to some embodiments of the present invention.

Reference is also made to FIG. 2, which is a schematic illustration of an exemplary system for constructing a hierarchical representation model of a compound 3D physical object, according to some embodiments of the present invention. An exemplary system 200 may include a model construction system 202, for example, a server, a computing node, a cluster of computing nodes and/or the like for generating a 3D representation model for a compound 3D physical object 204 which may be an inanimate object, a living object and/or a combination thereof.

It is assumed that the compound physical object 204 is constructed of a main static component having a single representation state and one or more dynamic components each having a plurality of representation states. Since the static component is not moveable, transformable and/or displaceable, the static component defines the general visual appearance of the compound physical object 204, i.e. the outline, the shape, the size and/or the like. The compound physical object 204 may include additional static components which have a single representation state, however the additional static components are not dominant in the sense that they do not defined the general visual appearance of the compound physical object 204. While the dynamic component(s) may slightly change, alter, and/or augment the general visual appearance of the compound physical object 204, such changes may be significantly minor such that the compound physical object 204 maintains the general visual appearance defined by the static component.

For example, assuming the compound physical object 204 is a car, the static component of the car may be the car body which defines the general visual appearance of the car. The car may include one or more dynamic components, for example, a door, an engine hood, a storage compartment door and/or the like which may each have one or more representation states, for example, closed, open, semi-open, lifted, lowered and/or the like. In another example, assuming the compound physical object 204 is a walking person, the static component of the person may be the overall body outline which defines the general visual appearance of the person. The walking person has one or more dynamic components, for example, one of the limbs, the head and/or the like which may each have one or more representation states, for example, lifted, lowered, straightened, folded, In case the compound physical object 204 does not comprise a main static component but rather the main component is also dynamic, i.e. moveable, transformable and/or displaceable or there is no dominant static component, the compound physical object 204 may be regarded as a different object in each of the different representation states of the main component.

One or more imaging sensors 230, for example, a camera, a video camera, a thermal imaging sensor, an infrared sensor and/or the like may be deployed to capture imagery data, for example, an image, a sequence of images, a video clip and/or the like depicting the compound physical object 204. Moreover, one or more of the imaging sensor(s) 230 may be monocular type sensors capable of generating 2D imagery data of the depicted scene (object).

The model construction system 202 may comprise an Input/Output (I/O) interface 210 for connecting to the imaging sensor(s) 230, a processor(s) 212 for executing a process such as the process 100 and a storage 214 for storing data and/or code (program store).

The I/O interface 210 may include one or more wired and/or wireless interfaces for communicating with one or more locally connected imaging devices 230A such as the imaging sensor 230. The I/O interface 210 may include, for example, a Universal Serial Bus (USB) interface, a Local Area Network (LAN) interface, a Wireless LAN (WLAN, e.g. Wi-Fi, etc.) interface and/or the like. Through the I/O interface 210, the model construction system 202 may obtain, for example, receive, fetch, retrieve and/or the like imagery data, for example, a picture, a sequence of pictures, a video clip, a thermal map and/or the like captured by the imaging devices 230A to depict the compound physical object 204.

The I/O interface 210 may further include one or more wired and/or wireless interfaces for connecting to a network 240 comprising one or more networks, for example, a LAN, a Wide Area Network (WAN), a Metropolitan Area Network (MAN), a cellular network, the internet and/or the like for communicating with one or more remote systems 250 and/or with one or more remote imaging devices 230B such as the imaging sensor 230. Through the I/O interface 210, the model construction system 202 may obtain the imagery data depicting the compound physical object 204 as captured by the remote imaging device(s) 230B. The model construction system 202 may obtain the imagery data captured by the remote imaging device(s) 230B from the remote imaging device(s) 230B in case it is connected to the network 240. Additionally and/or alternatively, the model construction system 202 obtains the imagery data from one or more of the remote systems 250 for example, a server, a computing node, a cluster of computing nodes, a cloud service, a cloud computing platform and/or the like storing the imagery data captured by the remote imaging device(s) 230B.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component and/or the like. The program store 214 may further comprise one or more network storage devices, for example, a storage server, a Network Accessible Storage (NAS), a network drive and/or the like accessible through the I/O interface 210.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a constructor 220 for generating the 3D representation model for the compound physical object 204. The constructor 220 may further utilize one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like.

Optionally, the model construction system 202 and/or the constructor 220 executed by the model construction system 202 are implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The exemplary process 100 is described herein after for generating the hierarchical 3D representation model for a single dynamic component of the compound physical object 204. This however should not be construed as limiting since the constructor 220 may generate the hierarchical 3D representation model for compound physical objects 204 constructed of a plurality of dynamic components.

As shown at 102, the process 100 starts with the constructor 220 obtaining the imagery data depicting the compound physical object 204 from the imaging sensor(s) 230. Specifically the obtained imagery data, for example, an image, a sequence of images, a video clip and/or the like is monocular 2D imagery data.

The imagery data comprises a plurality of image sets depicting the compound physical object 204 where each of the image sets comprises one or more images, frames and/or the like collectively designated images herein after. The imagery data is captured such that each pair of image sets corresponds to a certain dynamic component depicted in a certain one of the representation states applicable for the certain dynamic component such that only the certain dynamic object has a different representation state in the pair of images sets while each of the other dynamic components (if exist) is maintained in a single representation states in the pair of images sets. In case one or more of the dynamic components of the compound physical object 204 has more than two representation states, each representation state may be associated with a respective (separate) image set.

As stated herein before, the process 100 executed by the constructor 220 may be applied to generate the hierarchical 3D representation model for compound physical objects 204 constructed of a plurality of dynamic components. In such case a respective pair of image sets corresponds to each of the dynamic components in each of its applicable representation states.

Figure 3:
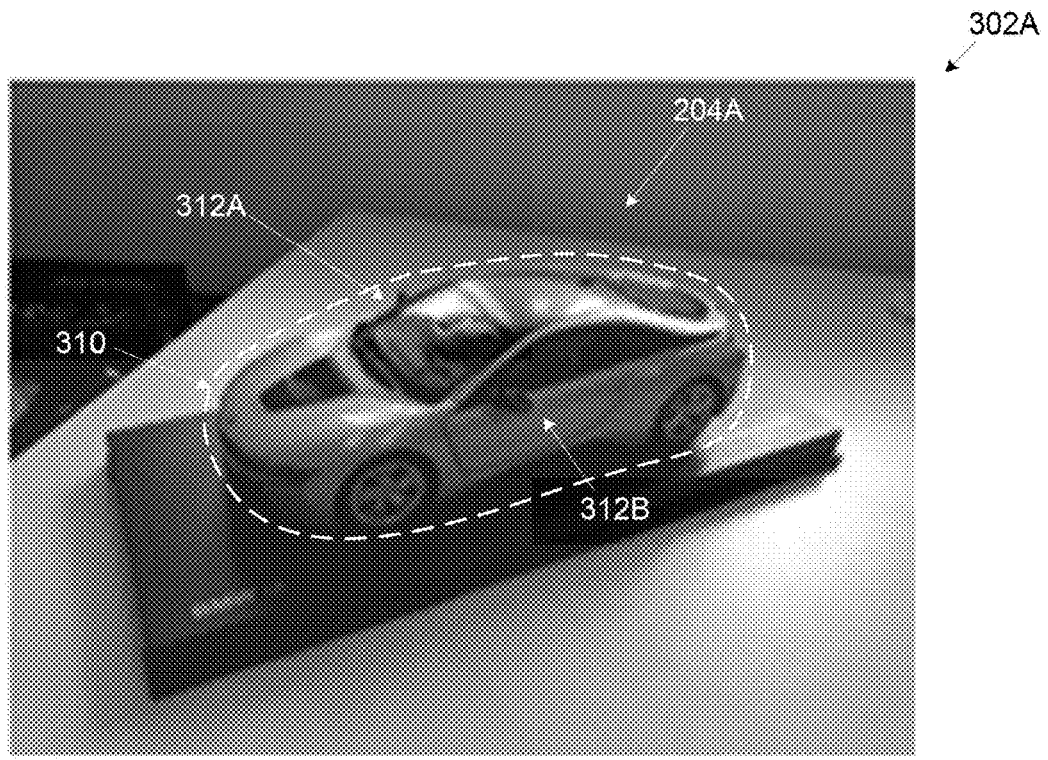
FIG. 3 is a schematic illustration of an exemplary compound 3D physical object constructed of a static component having a static representation state and a dynamic component having several representation states, according to some embodiments of the present invention.
Figure 3:
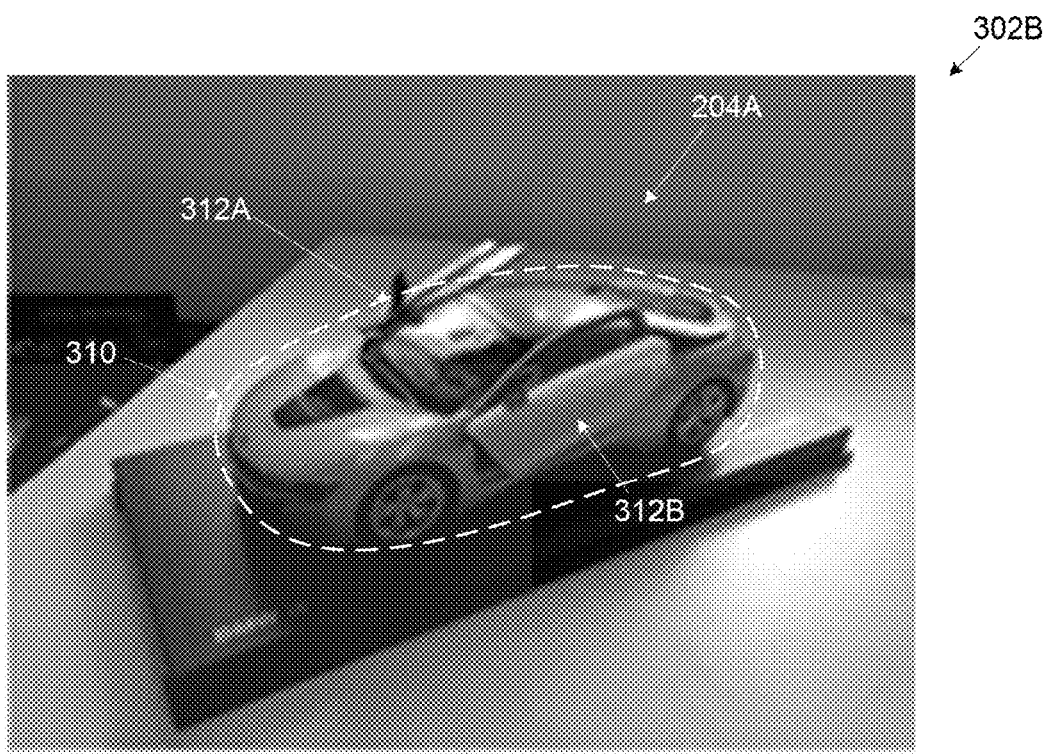

Reference is now made to FIG. 3, which is a schematic illustration of an exemplary compound 3D physical object constructed of a static component having a static representation state and a dynamic component having several representation states, according to some embodiments of the present invention. A pair of exemplary image sets 302A and 302B depicts an exemplary car compound physical object 204A embodiment of the compound physical object 204. The car object 204A includes a static component 310, i.e. the car body and a dynamic component 312, for example, a door assembly comprising of two separate sub-components, 312A and 312B, i.e. two doors.

The image set 302A presents the door assembly 312 in a first representation state, i.e. the door 312A and the door 312B are closed. The image set 302B on the other hand presents the door assembly 312 in a second representation state, i.e. the doors 312A and the door 312B are semi-open. However, as evident in the image sets 302A and 302B, while the different representation states of the door assembly 312 may slightly alter the general visual appearance of the car object 204A, the general visual appearance of the car object 204A defined by the car body static component 310 is maintained in both the images sets 302A and 302B.

Reference is made once again to FIG. 1.

As shown are 104, the constructor 220 generates a pair of point cloud structures for each pair of images sets. As such, a respective point cloud structure is generated for each image set of each pair of images sets. Each point cloud structure comprises a set of 3D points in some coordinate system. Each cloud point is further associated with one or more key frames generated from each respective image set. The key frame(s) comprise pose information defining a view angle of the depicted compound physical object with respect to the imaging sensor 230 which captured the respective image set.

The constructor 220 may apply one or more techniques, algorithms, tools, applications and/or the like for generating the point cloud structures and/or their associated key frame(s). For example, the constructor 220 may apply one or more SfM algorithms for generating one or more of the point cloud structures as known in the art.

As shown are 106, the constructor 220 registers each pair of point cloud structures to a common coordinate system to align the point cloud structures of each pair with each other. The constructor 220 may use the pose information extracted from the key frames to register the two point cloud structures based on identification and matching of visual features of the static component which is assumed to have little variation between the two point cloud structures.

The constructor 220 may apply a pairwise registration of the two point cloud structures of each pair to establish the common coordinate system for the point cloud structures. The constructor 220 may first apply one or more algorithms to the pose information to compute a rigid transformation between the two point cloud structures of each pair for initiating pose estimation. The constructor 220 may then refine the registration by searching for visual correspondences between the key frames associated with the two point cloud structures. To this end, the constructor 220 may project points of a key frame associated with the first point cloud structure of each pair onto a key frame associated with the second point cloud structure of the respective pair using the initiation pose estimation. The constructor 220 may refine positions of one or more points (key points) of the first key frame projected on the second key frame according to visual descriptors computed for compound physical object 204 according to each of the key frames of the two point cloud structures of the respective pair.

The constructor 220 may apply one or more feature extractions algorithms, for example, SIFT algorithm and/or the like for extracting the visual features for each point and computing the respective visual descriptors. Specifically, the constructor 220 refines positions of the key points having computed visual descriptors corresponding to the static component which is assumed to be substantially similar in the two key frames associated with the two point cloud structures of the respective pair. The constructor 220 may optionally discard one or more projected points presenting a difference between their visual descriptors in the two key frames which exceeds a predefined threshold. Based on the position difference between the projected key points, the constructor 220 may update the pose estimation for the key frames. The constructor 220 may use one or more techniques, methods and/or algorithms for updating the position of the projected point(s), for example, a Perspective-n-Point (PnP) algorithm.

As shown are 108, the constructor 220 analyzes each pair of point cloud structures to identify one or more common regions present in both point cloud structures of the pair and one or more regions of difference between the two point cloud structures. The common regions which are determined to be part of the compound physical object 204 may be associated with the static component while the region(s) of difference determined to be part of the compound physical object 204 may be associated with the respective dynamic component corresponding to the respective pair of analyzed point cloud structures.

I order to identify the common regions and the region(s) of difference, and moreover to define a boundary (border line) between them, the constructor 220 may classify each of the plurality of points determined to be part of the compound physical object 204 to either the common regions or to the region(s) of difference. The constructor 220 may classify each of the plurality of points determined to be part of the compound physical object 204 by performing the following operations:

(a) Compute a location of each point in the first key frame associated with the first point cloud structure of the pair. In case the first point cloud structure is associated with multiple key frames, the constructor 220 may compute a set of locations each corresponding to a respective one of the multitude of key frames.

(b) Compute visual descriptors for each of the set of locations of each point computed for the first key frame(s) using, for example, the SIFT algorithm. This set of visual descriptors is designated descriptors set 1.

(c) Compute a location of each point in the second key frame associated with the second point cloud structure of the pair. In case the second point cloud structure is associated with multiple key frames, the constructor 220 may compute a set of locations each corresponding to a respective one of the multitude of key frames.

(d) Compute visual descriptors for each of the set of locations of each point computed for the second key frame(s) using, for example, the SIFT algorithm. This set of visual descriptors is designated descriptors set 2.

(e) Calculate a Euclidean distance dV for each point between corresponding visual descriptors from visual descriptors set 1 and from visual descriptors set 2 computed for the respective point.

(f) Compute a score for the respective point based on the calculated Euclidean distance, for example, a mean of 30% lowest values of descriptor distances dV.

(g) Classify the respective point to the respective dynamic component in case the computed score exceeds a predefined threshold. Complementary, classify the respective point to the static component in case the computed score does not exceed the predefined threshold. Respective points having a low computed score, for example, close to 0 present little visual deviation in their presentation in the first and second point cloud structures of the pair. Such points are therefore highly probable to be part of the common region(s) presented by both point cloud structures of the pair and may be classified to the static component accordingly. Respective points having a high computed score, on the other hand, present significant visual deviation in their presentation in the first and second point cloud structures of the pair. Such points are therefore highly probable to be part of the region(s) of difference between the point cloud structures and may be classified to the dynamic component accordingly.

Optionally, the constructor 220 filters out one or more of the points in case the respective point determined to present insufficient differentiation between the pair of point cloud structures. The constructor 220 determines the respective point determined to present insufficient differentiation by comparing the location of the respective point in each of point cloud structures of the pair to a predefined threshold. For example, the $$\frac{d_1}{d_2} \text{ and/or } \frac{d_2}{d_1}$$

constructor 220 may compute a depth ratio between the depth values of the respective point in each of the point cloud structures of the pair. In case the maximum depth ratio, $$\max\left(\frac{d_1}{d_2}, \frac{d_2}{d_1}\right)$$

exceeds the predefined filtering threshold, for example, 1.15, the constructor 220 may discard, i.e. filter out the respective point. In another example, the constructor 220 may compute an angle difference $\alpha$ between view angles of the respective point in each of the point cloud structures of the pair based on the pose information extracted from the respective first and second key frames. In case the value of $\alpha$, specifically the value of $\cos(\alpha)$ does not exceed a predefined filtering threshold, for example, 0.8, the constructor 220 may discard, i.e. filter out the respective point.

Optionally, the constructor 220 applies one or more smoothing filters, for example, a 3D bilateral filter on the scores computes for one or more of the points in one or both of the point cloud structures of the pair to smooth the scores values while preserving the spatial edges between the two common region(s) and the region(s) of difference.

After classifying all points determined to be part of the compound physical object 204, the constructor 220 may define a boundary for the region(s) of difference defining a segment, specifically one or more 2D surface segment(s) which encompasses the points classified to the respective dynamic component.

As shown at 110, the constructor 220 generates a hierarchical 3D representation model of the compound physical object 204 based on the points of the pair of point cloud structures. The constructor 220 may use the points classified to the static component to generate a high level 3D representation model for the static component in the hierarchical 3D representation model. The constructor 220 may further mark an outline (boundary) of the surface segment(s) in the high level 3D representation model of the static component. The constructor 220 may use the points in each point cloud structure of the pair classified to the respective dynamic component to generate a plurality of lower level 3D representation models each for a respective representation state of the respective dynamic component.

The constructor 220 may apply one or more segmentation algorithm, for example, Chan-Vese segmentation algorithm for active contours to generate the model of the static component and the models of the respective dynamic component. The segmentation algorithm may further optimize the shape of the surface segment subject to one or more criterions of best discrimination of scores while preserving low total curvature of the surface segment. The cost function applied by the constructor 220 for the segmentation algorithm may contain two data fidelity components, corresponding to the two point cloud structures of the pair.

The constructor 220 may generate the hierarchical 3D representation model by associating (linking) the plurality of lower level 3D models to the outlined (bounded) surface segment(s) marked in the high level 3D representation model of the static component. Moreover, in case the compound physical object includes multiple dynamic components, the constructor 220 may create a modular hierarchical 3D representation models in which the lower level 3D representation models generated for each of the dynamic components are linked to the respective surface segments outlined in the high level 3D representation model of the static component.

As shown at 112, the constructor 220 may output the hierarchical 3D representation model generated for the compound physical object 204.

The hierarchical 3D representation model of the compound physical object 204 may be used for one or more of operations directed for one or more objectives, goals and/or uses, for example, object detection, object tracking, object augmentation and/or the like. Such operations may be highly suitable and effective for a plurality of applications, for example, autonomous vehicles, surveillance, security, virtual reality, augmented reality, training, education and/or the like.

For example, assuming the compound physical object is a complex piece of technical equipment, for example, machinery, car, electronic equipment and/or the like. An operator and/or a technician operating and/or performing maintenance work or repair may need perform one or more operations, for example, remove or lift cover(s) and/or panel(s), dismount part(s), work on the internal part(s) and/or the like. Each such operation may change the representation state (appearance) of the technical equipment piece. The representation model created for the technical equipment piece may be constructed by the constructor 220 as a modular light weight hierarchical 3D representation model which models the components of the technical equipment piece in a hierarchical fashion which may be traversed back and forth through its levels according to the operation required by the operator/technician.

Figure 4:
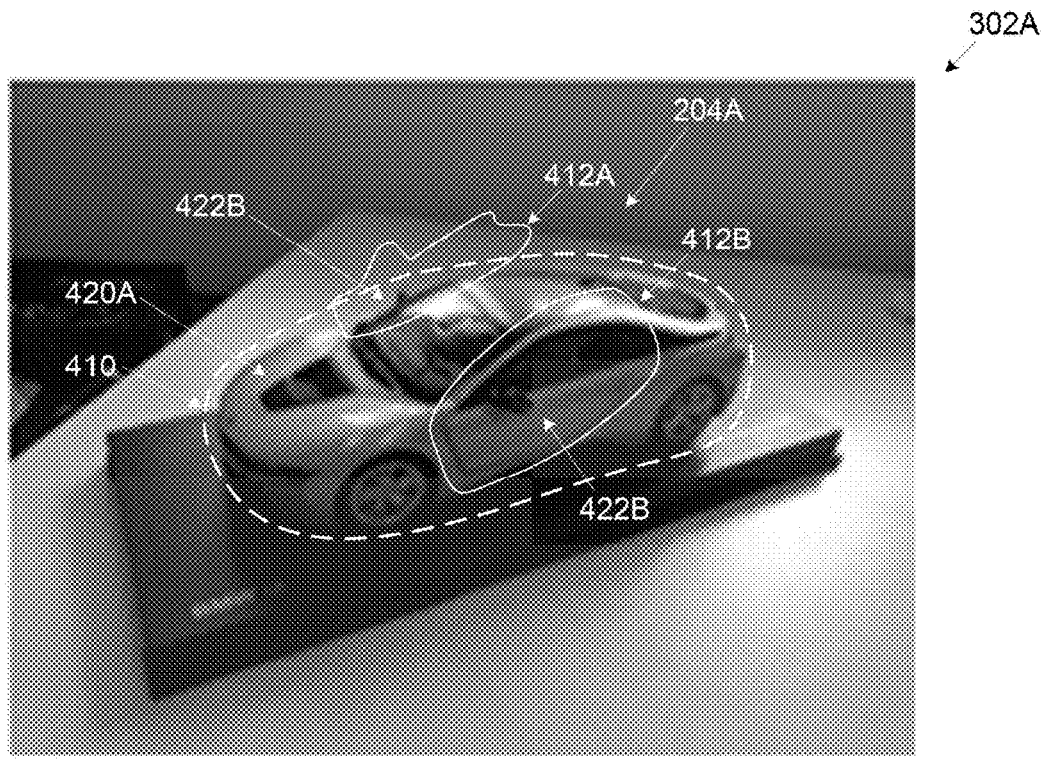
FIG. 4 is a schematic illustration of an exemplary compound 3D physical object constructed marked with regions of difference associated with a dynamic component having several representation states, according to some embodiments of the present invention.
Figure 4:
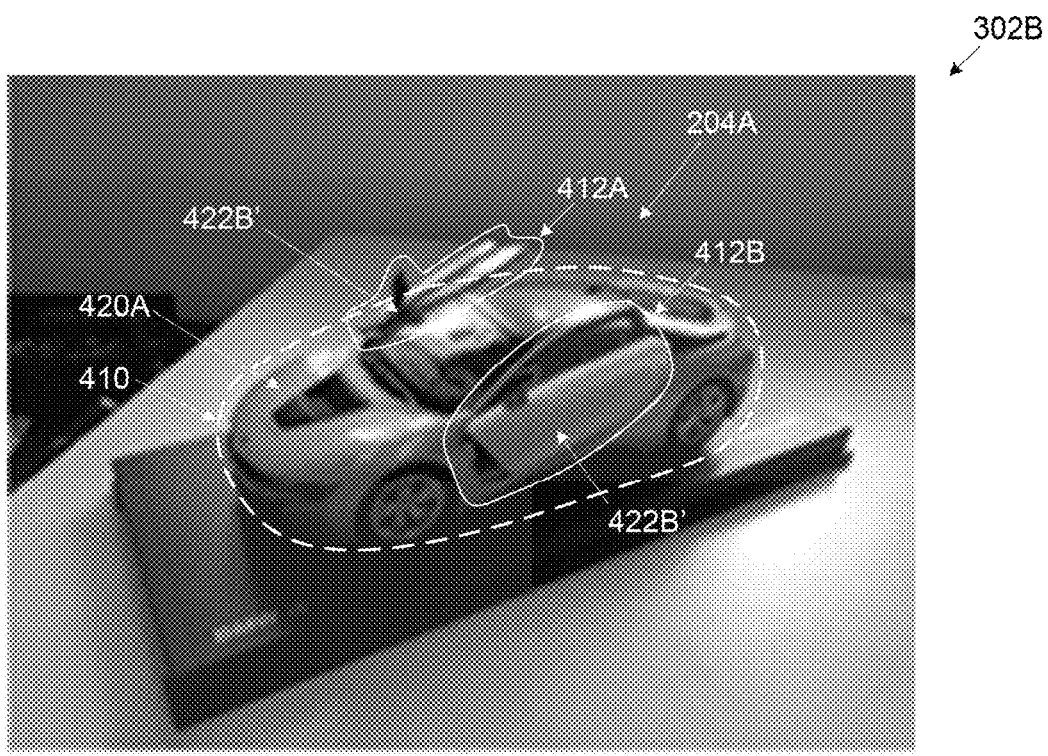

Reference is now made to FIG. 4, which is a schematic illustration of an exemplary compound 3D physical object constructed marked with regions of difference associated with a dynamic component having several representation states, according to some embodiments of the present invention. A pair of exemplary image sets such as the image sets 302A and 302B depicts an exemplary car compound physical object such as car compound physical object 204A. The car object 204A includes a car body static component such as the car body static component 310 and a door assembly dynamic object 312 comprising of two separate sub-components such as the doors 312A and 312B.

A constructor such as the constructor 220 applying the process 100 may analyze the pair of image sets 302A and 302B to generate respective point cloud structures which are further analyzed to identify a common region 410 associated with the car body static component 310 and the surface segment comprising two regions of difference 412A and 412B associated with the door assembly dynamic object 312. The constructor 220 may generate a hierarchical 3D representation model for the compound physical object 204 which comprises a high level 3D model 420A generated for the car body static component 310. The high level 3D model 420A created by the constructor 220 for the car body static component 310 is outlined with the surface segment defining the region(s) of difference 412A and 412B. The constructor 220 may create a plurality of lower level 3D models, specifically two lower level 3D models 422B and 422B' each associated with a respective one of the two states of the door assembly dynamic object 312, specifically, the closed state and the semi-open state. The constructor 220 may associate the two lower level 3D models 422B and 422B' with the surface segment defining the region(s) of difference 412A and 412B. Such that the hierarchical 3D representation model of the compound physical object 204 includes the high level 3D model 420A of the car body static component 310 and the two lower level 3D models 422B and 422B' of the door assembly dynamic object 312.

It is expected that during the life of a patent maturing from this application many relevant systems, methods and computer programs will be developed and the scope of the terms point cloud generation, smoothing filters and segmentation algorithms are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of constructing hierarchical representation models of compound three dimension (3D) physical objects, comprising:
    receiving a plurality of image sets depicting a compound 3D physical object constructed of a static component having a single representation state and at least one dynamic component having a plurality of representation states, each pair of the plurality of image sets corresponds to a respective dynamic component and each image set of the pair depicts the respective dynamic component in a respective one of the plurality of representation states;
    generating a pair of point cloud structures from each pair of image sets;
    analyzing the pair of point cloud structures registered to a common coordinate system to identify at least one common region of the pair of point cloud structures associated with the static component and at least one region of difference between the pair of point cloud structures associated with the respective dynamic component;
    generating a hierarchical 3D representation model of the compound physical object comprising a high level model of the static component generated from the at least one common region with a surface outline of the at least one region of difference associated with a plurality of lower level models each associated with a respective one of the plurality of representation states of the respective dynamic component, each of the of lower level models is created from the segment of each of the pair of point clouds contained by the at least one region of difference; and
    outputting the hierarchical 3D representation model.

2. The method of claim 1, wherein each pair of image sets corresponding to a respective dynamic component point depicts the respective states of the respective dynamic component while depicting a common state of each of at least one another dynamic component.

3. The method of claim 1, wherein the pair of point cloud structures is generated from the pair of image sets by applying at least one structure from motion (SfM) algorithm.

4. The method of claim 1, wherein each of the point cloud structures is associated with at least one key frame generated from the respective image set of the pair, the at least one key frame comprising pose information defining a view angle of the depicted compound physical object with respect to an imaging sensor which captured the respective image set.

5. The method of claim 1, wherein the analysis to identify the at least one region of difference comprising classifying each point of a plurality of points corresponding to the compound physical object in each of the pair of point cloud structures to the static component or to the respective dynamic component by performing the following:
    (a) compute the location of the respective point in the common coordinate system,
    (b) compute a visual descriptor for the respective point in each of the pair of point cloud structures,
    (c) calculate a Euclidean distance between the two visual descriptors computed for the respective point in the two point cloud structures of the pair,
    (d) compute a score for the respective point based on the calculated Euclidean distance, and (e) classify the respective point to the respective dynamic component in case the computed score exceeds a predefined threshold or classify the respective point to the static component in case the computed score does not exceed the predefined threshold.

6. The method of claim 1, further comprising using the generated hierarchical three 3D representation model of the compound physical object for at least one of: object detection, object tracking and object augmentation.

7. The method of claim 4, further comprising registering the pair of point cloud structures to the common coordinate system according to the pose information extracted from the at least one key frame of each image set of the pair for points of the point cloud structures corresponding to the static component.

8. The method of claim 5, wherein a boundary is defined for the at least one region of difference defining the segment which encompasses the points classified to the respective dynamic component.

9. The method of claim 5, further comprising filtering out the respective point in case the location of the respective point in the pair of point cloud structures exceeds a predefined threshold thus the respective point is determined to present insufficient differentiation between the two point cloud structures of the pair, comparing the location of the respective point in the two point cloud structures of the pair comprises:
   (a) computing a depth ratio of the depth of the respective point in each of the point cloud structures of the pair,
   (b) computing a difference between view angles of the respective point in each of the point cloud structures of the pair,
   (c) filtering out the respective point to the respective dynamic component in case the depth ratio or the view angle difference exceeds a predefined filtering threshold.

10. The method of claim 5, further comprising applying at least one filter to the score of at least some of the plurality of points to smooth the score.

11. The method of claim 5, further comprising applying at least one segmentation algorithm to optimize a shape of the segment defined by boundary for the at least one region of difference according to at least one discrimination criteria.

12. The method of claim 10, wherein the at least one filter is a bilateral filter.

13. A computer program product for constructing hierarchical representation models of compound three dimension (3D) physical objects, comprising:
   a non-transitory computer readable storage medium;
   first code instructions for receiving a plurality of image sets depicting a compound 3D physical object constructed of a static component having a single representation state and at least one dynamic component having a plurality of representation states, each pair of the plurality of image sets corresponds to a respective dynamic component and each image set of the pair depicts the respective dynamic component in a respective one of the plurality of representation states;
   second code instructions for generating a pair of point cloud structures from each pair of image sets;
   third code instructions for analyzing the pair of point cloud structures registered to a common coordinate system to identify at least one common region of the pair of point cloud structures associated with the static component and at least one region of difference between the pair of point cloud structures associated with the respective dynamic component;
   fourth code instructions for generating a hierarchical 3D representation model of the compound physical object comprising a high level model of the static component generated from the at least one common region with a surface outline of the at least one region of difference associated with a plurality of lower level models each associated with a respective one of the plurality of representation states of the respective dynamic component, each of the of lower level models is created from the segment of each of the pair of point clouds contained by the at least one region of difference; and
   fifth code instructions for outputting the hierarchical 3D representation model;
   wherein the first, second, third, fourth and fifth program instructions are executed by at least one processor from said non-transitory computer readable storage medium.

\* \* \* \* \*